United States Patent
Jain et al.

(10) Patent No.: US 8,130,927 B2
(45) Date of Patent: Mar. 6, 2012

(54) ENHANCED DIRECTORY FOR COMMUNICATIONS DEVICES

(75) Inventors: Mukul Jain, San Jose, CA (US);
Shmuel Shaffer, Palo Alto, CA (US);
Labhesh Patel, San Francisco, CA (US);
Sanjeev Kumar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 979 days.

(21) Appl. No.: 12/113,312

(22) Filed: May 1, 2008

(65) Prior Publication Data
US 2009/0274283 A1 Nov. 5, 2009

(51) Int. Cl.
*H04M 1/56* (2006.01)
*H04M 15/06* (2006.01)
*H04M 3/42* (2006.01)

(52) U.S. Cl. .............................. 379/142.07; 379/212.01

(58) Field of Classification Search ............ 379/142.01, 379/142.07, 207.14, 210.01, 211.02, 212.01
See application file for complete search history.

(56) References Cited

U.S. PATENT DOCUMENTS

| 5,875,240 | A * | 2/1999 | Silverman | 379/142.07 |
| 7,154,999 | B2 * | 12/2006 | Florkey et al. | 379/142.01 |
| 7,729,488 | B2 * | 6/2010 | Daigle | 379/211.04 |
| 2003/0198329 | A1 * | 10/2003 | McGee | 379/202.01 |
| 2007/0041545 | A1 * | 2/2007 | Gainsboro | 379/188 |

* cited by examiner

*Primary Examiner* — Quoc D Tran
(74) *Attorney, Agent, or Firm* — P. Su (57) ABSTRACT

In one embodiment, a method includes establishing a call, and continuously monitoring the call from or using a first endpoint associated with the call. Monitoring the call includes identifying when an information element associated with the call has changed. The method also includes determining when the information associated with the call has changed, and storing a representation of the information element in an enhanced directory arrangement associated with the first endpoint when the information associated with the call has changed.

26 Claims, 11 Drawing Sheets

ENHANCED DIRECTORY FOR COMMUNICATIONS DEVICES

BACKGROUND OF THE INVENTION

The present invention relates generally to communications systems.

Voice over Internet Protocol (VoIP) telephones, as well as mobile telephones and other types of telephones, often provide functionality that facilitates the dialing of telephone calls. Such functionality may be provided through directories which enable users to readily access and dial telephone numbers. By way of example, many telephones include a directory of missed calls which substantially automatically stores telephone numbers of call originators that failed to complete a call, a directory of received calls which substantially automatically stores telephone numbers of call originators that successfully completed a call, a directory of placed calls which substantially automatically stores telephone numbers that were dialed, and a personal directory which stores telephone numbers which are likely to be dialed.

The use of directories allows a user to efficiently select a telephone number and dial that telephone number. For instance, if a user wishes to call back someone he or she has just received a call from, he or she may access a directory of received calls and select a telephone number to dial. Similarly, if a user wishes to call back someone he or she has fairly recently called, he or she may access a directory of placed calls and select a telephone number to dial.

Communications networks that support the use of communications devices such as telephones generally enable communications to effectively be handed off, e.g., transferred, between different communications devices. By way of example, if a first individual uses a first device to call a second individual at a second device, the second individual may use the second device to transfer the call to a third individual at a third device. Upon transferring the call to the third device, the second device effectively becomes idle with respect to the call while the first device is in communication with the third device on the call. The caller identifier (ID), e.g., a telephone number, of the third device may be displayed on a display associated with the first device during the call such that the first device may identify the third device as being on the other end of the call. However, once the call is terminated, there is effectively no record stored on the first device which indicates that the first device was on the call with the third device. As such, a user of the first device may be unable to readily initiate another call to the owner of third device, as for example to continue the conversation which occurred during the now terminated call.

BRIEF DESCRIPTION OF THE DRAWINGS

The invention will be readily understood by the following detailed description in conjunction with the accompanying drawings, wherein like reference numerals designate like structural elements, and in which.

DESCRIPTION OF EXAMPLE EMBODIMENTS

General Overview

According to one aspect of the present invention, a method includes establishing a call, and continuously monitoring the call from or using a first endpoint associated with the call.

Monitoring the call includes identifying when an information element associated with the call has changed. The method also includes determining when the information associated with the call has changed, and storing a representation of the information element in an enhanced directory arrangement associated with the first endpoint when the information associated with the call has changed.

Description

When a call is transferred between communications devices, storing information relating to the transfer may facilitate the reconnection of the communications devices at a later time. By way of example, storing information which indicates that a call from a first device to a second device has been transferred by the second device to a third device allows the first device and the third device to reconnect at a later time. Such information may be stored on the first device and/or the third device in directories arranged to store information relating to transferred calls.

An enhanced directory arrangement includes a directory into which information relating to transferred calls may be stored. For instance, a caller ID of an originator of a call that was transferred to a particular endpoint may be obtained and recorded in a transferred calls directory that is maintained on that particular endpoint. Similarly, a caller of ID of an endpoint to which a call was transferred may be obtained and recorded in a transferred calls directory on an endpoint which originally initiated the call. The transferred calls directories generally enable information, e.g., caller IDs, relating to transferred calls to be retrieved once the transferred calls are terminated.

To obtain caller IDs that may be stored in an enhanced directory arrangement, endpoints or communications devices may include caller ID observers which are arranged to substantially continuously monitor information elements received during the course of a call to determine when a caller ID associated with the information elements has changed. That is, caller ID observers effectively continuously monitor mid-call signaling between endpoints associated with a call. If a caller ID observer detects that a caller ID has changed during the course of the call, the new caller ID may be recorded in an overall enhanced directory arrangement, e.g., in a transferred calls directory. For instance, if a caller ID observer detects that the caller ID has changed mid-call from identifying a first endpoint to identifying a second endpoint, the caller ID of the second endpoint may be stored in a transferred calls directory.

Figure 1A:
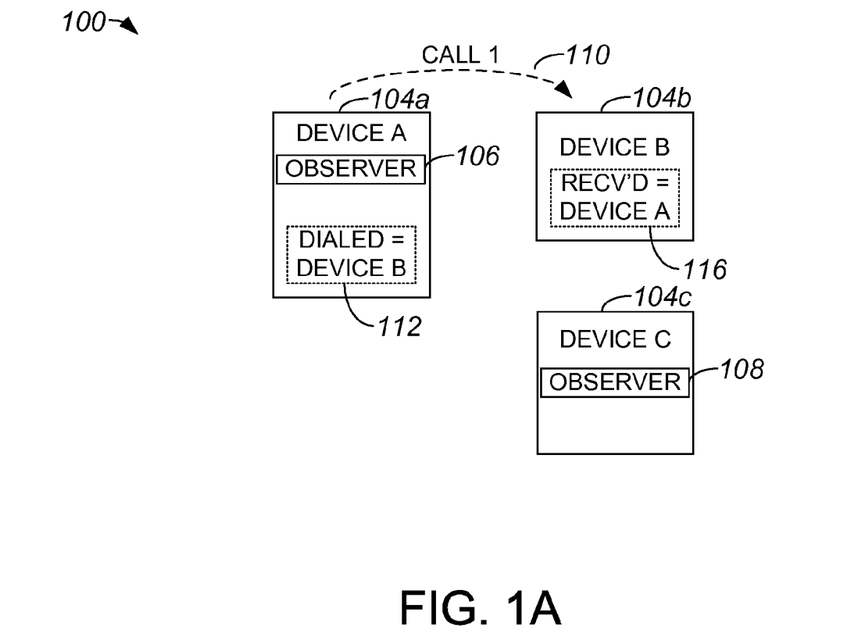
FIG. 1A is a diagrammatic representation of a communications network at a time t1 at which a first device connects on a call to a second device in accordance with an embodiment of the present invention.

Referring initially to FIG. 1A, a communications network at a time t1 at which a first device connects on a call to a second device will be described in accordance with an embodiment of the present invention. A communications network 100, which may be a cellular telephony network, a public switching telephone network (PSTN), a network that supports voice over Internet Protocol (VoIP) communications or other telephone communications, includes a plurality of communications devices 104a-104c. Devices 104a-104c may include, but are not limited to including, VoIP telephones, mobile telephones, and landline telephones. Devices 104a, 104c include observers 106, 108, respectively, which are arranged to continuously monitor identifying information contained in packets or communications signals received by devices 104a, 104c. In general, observers 106, 108 may observe information elements in the packets to determine whether the caller ID contained in the information elements changes. It should be appreciated that although device 104b is not shown as including an observer, device 104b may also include an observer.

At time t1, device 104a and device 104b are engaged in a call 110 that was effectively initiated by device 104a or, more specifically, by a user of device 104a. As device 104a initiated call 110 and, hence, an overall call chain, device 104a may be considered to be a call chain originator or an endpoint from which call 110 was placed. During a call setup process that occurs when device 104a calls device 104b, device 104a stores an indication 112 that device 104b was dialed and device 104b stores an indication 116 that call 110 was received from device 104a. In one embodiment, indication 112 may be stored in a placed calls directory of device 104a, while indication 116 may be stored in a received calls directory of device 104b.

When device 104a and device 104b are connected on call 110, a user of device 104a may talk with or otherwise exchange information with a user of device 104b. During the course of conversation, the user of device 104b may determine that call 110 should be transferred to device 104c such that the user of device 104a may converse or otherwise exchange information with a user of device 104c. By way of example, if the user of device 104a initiated call 110 to the user of device 104b to ask a question that the user of device 104b determines would be better answered by the user of device 104c, the user of device 104b may effectively transfer call 110 to the user of device 104c.

Figure 1B:
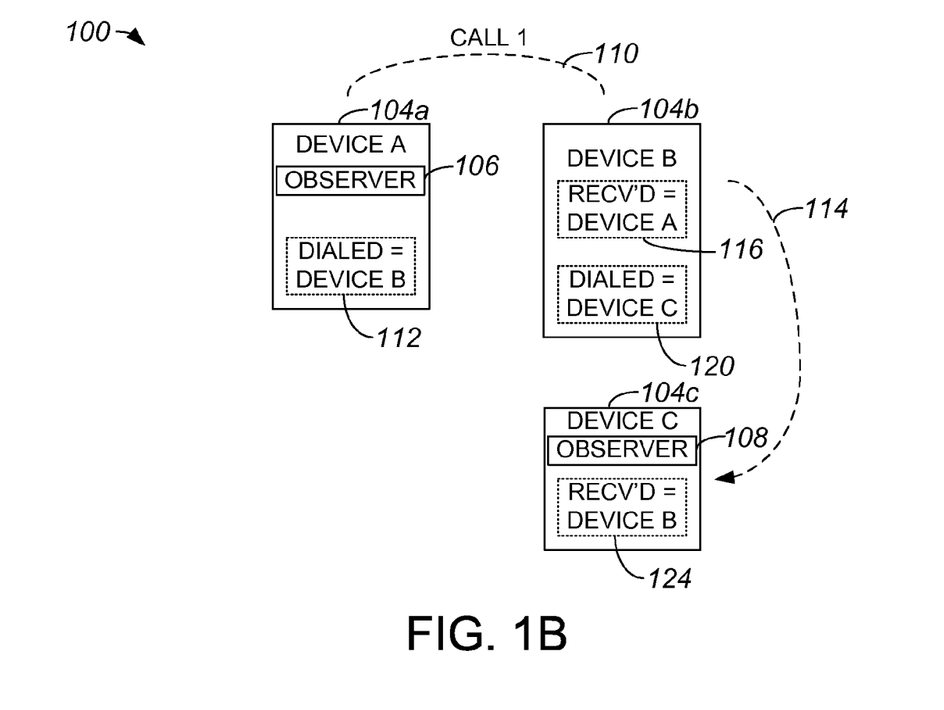
FIG. 1B is a diagrammatic representation of a communications network, e.g., communications network 100 of FIG. 1A, at a time t2 at which a second device connects on a call to a third device in order to effectuate a subsequent call transfer connection between a first device and the third device in accordance with an embodiment of the present invention.

FIG. 1B shows communications network 100 at a time t2 at which device 104b, e.g., a transferor or a call transferring agent, connects on a call 114 to device 104c in order to effectuate a subsequent call transfer that will result in device 104a being effectively connected to device 104c. At time t2, device 104b has placed device 104a on hold while device 104b establishes call or connection 114 with device 104c, which is a transfer target device or the device to which call 110 from device 104a is to subsequently be transferred. During the call setup process associated with call or connection 114 made by device 104b to device 104c, an indication 120 that device 104b has placed call 114 to device 104c may be stored by device 104b, while an indication 124 that device 104c has received call 114 from device 104b may be stored by device 104c.

Once connection or call 114 between device 104b and device 104c is established, device 104b may transfer call 110 initiated by device 104a, e.g., a transferee, from device 104b to device 104c, e.g., a transfer target. In one embodiment, device 104b may not store any indication that it transferred call 110, as will be discussed with respect to FIG. 1C. Alternatively, device 104b may store an indication that it transferred call 110, as will be described below with reference to FIG. 1D.

Figure 1C:
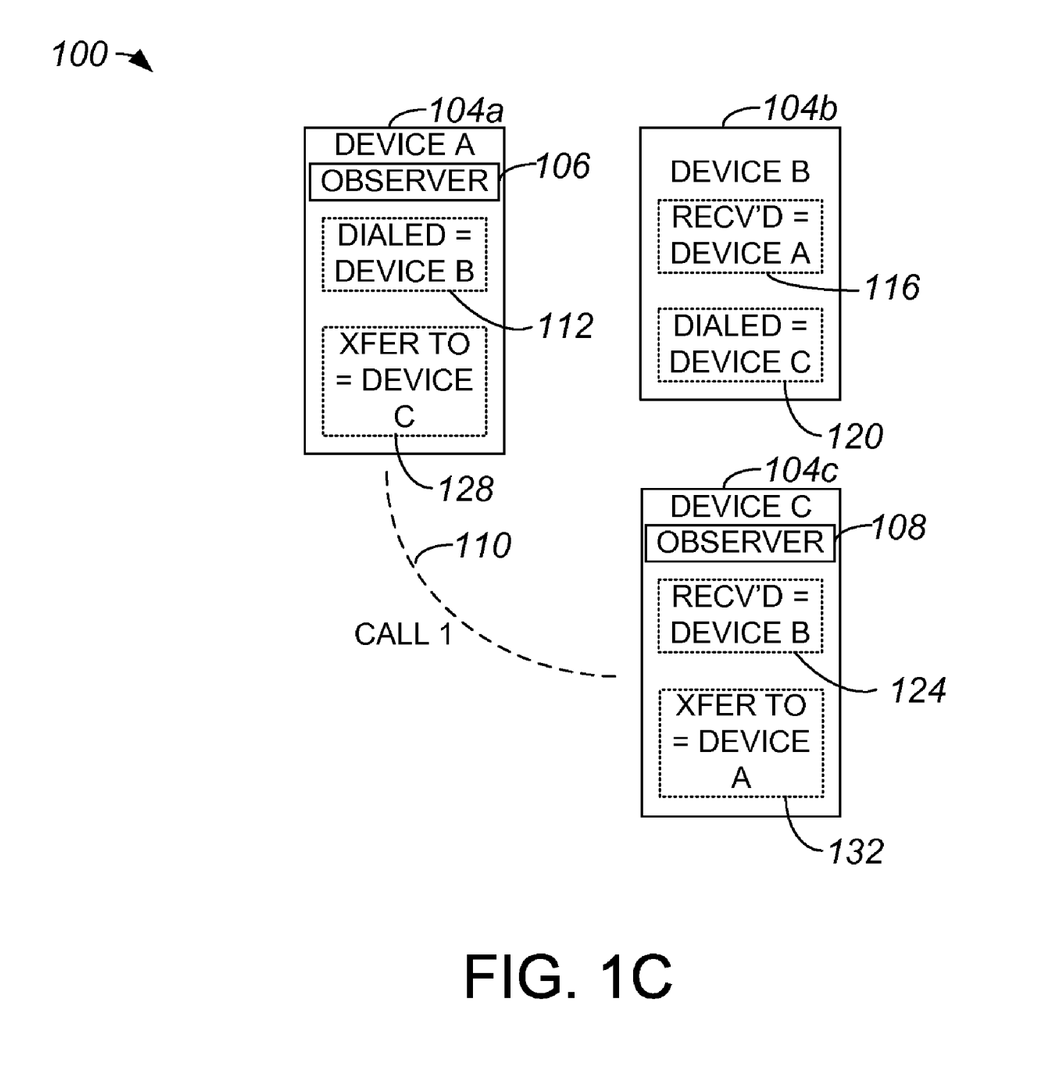
FIG. 1C is a diagrammatic representation of a communications network, e.g., communications network 100 of FIG. 1A, at a time t3 at which a first device has been transferred such that the first device is connected on a call to a third device in accordance with a first embodiment of the present invention in which a second device does not store transfer information.

FIG. 1C shows communications network 100 at a time t3 at which call 110 has been transferred to device 104c, and device 104b does not store an indication that device 104b substantially made the transfer in accordance with one embodiment of the present invention. At time t3, device 104b has caused call 110 initiated by device 104a to be transferred from device 104b to device 104c, and effectively dropped call 114. Hence, a user of device 104a may converse directly with a user of device 104c on call 110. Although FIGS. 1A-1C use "call 1" as a notation, those of skill in the art may recognize that in some example implementations, as a part of a transfer process, an original "call 1" may be dropped and a new "call 1" may be established between device 104a and device 104c.

In the described embodiment, observer 106 has determined, through substantially continuous monitoring, that the information elements exchanged on call 110 indicate a different caller ID. That is, observer 110 may determine that call 110 is now between device 104*a* and device 104*c*, and no longer between device 104*a* and device 104*b*. As such, device 104*a* may store an indication 128 that call 110 has been transferred to device 104*c*. Indication 128 may be stored in a transferred calls directory associated with device 104*a*.

Similarly, observer 108 may determine, also through substantially continuous monitoring, that device 104*c* is no longer on a call with device 104*b*, but is instead on call 110 with device 104*a*. Accordingly, device 104*c* may store an indication 132 that it is on the receiving end of transferred call 110. In other words, device 104*c* may store an indication 132 that it is the transfer target of call 110 initiated by device 104*a*. Indication 132 may indicate that device 104*c* is the target of a call placed by device 104*a* and transferred by device 104*b*.

Figure 1D:
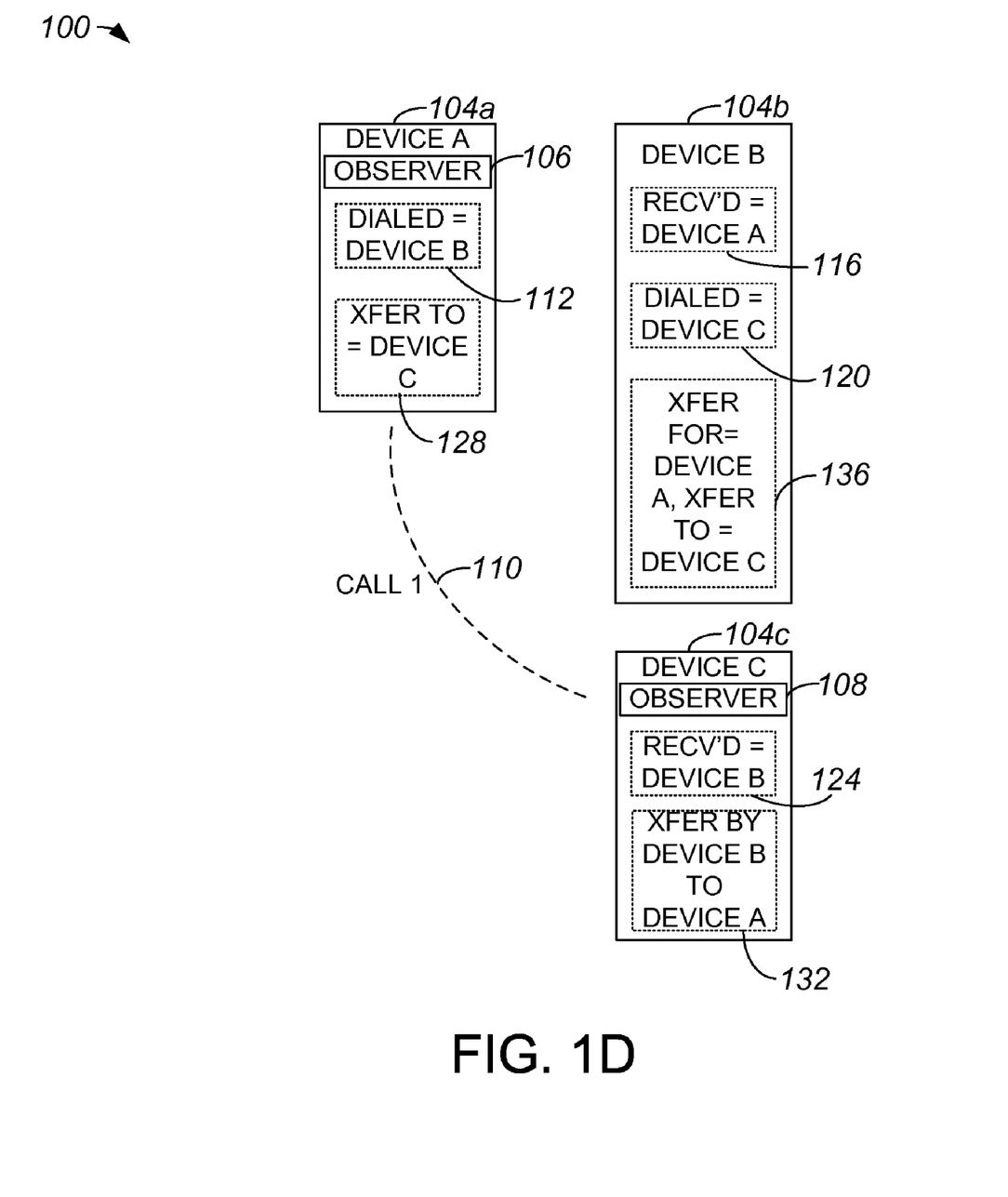
FIG. 1D is a diagrammatic representation of a communications network, e.g., communications network 100 of FIG. 1A, at a time t3 at which a first device has been transferred such that the first device is connected on a call to a third device in accordance with a second embodiment of the present invention in which a second device stores transfer information.

As previously mentioned, in one embodiment, device 104*b* may be arranged to store information pertaining to transfers it facilitates. With reference to FIG. 1D, communications network 100 will be described at a time t3 at which a call initiated by device 104*a* has been transferred to device 104*c*, and at which device 104*b* has stored information regarding the transfer in accordance with a second embodiment of the present invention in which a second device stores transfer information. At time t3, device 104*b* has caused call 110 initiated by device 104*a* to be transferred from device 104*b* to device 104*c*, and effectively dropped call 114. Device 104*a* stores indication 128 that call 110 has been transferred to device 104*c*, and device 104*c* stores an indication 132 that it is on the receiving end of transferred call 110. In one embodiment, device 104*c* may additionally store an indication that indicates that the transfer of call 110 was facilitated by device 104*b*.

Device 104*b* stores information that is arranged to indicate that device 104*b* served as a transferring agent in a call chain that includes devices 104*a*-104*c*. As shown, device 104*b* may store an indication 136, e.g., in a transferred calls directory associated with device 104*b*, that it transferred call 110 initiated by device 104*a* to device 104*c*. Indication 136 may identify device 104*a* as a call chain initiator or a transferee, and device 132 as a call chain end or transfer target.

Figure 2:
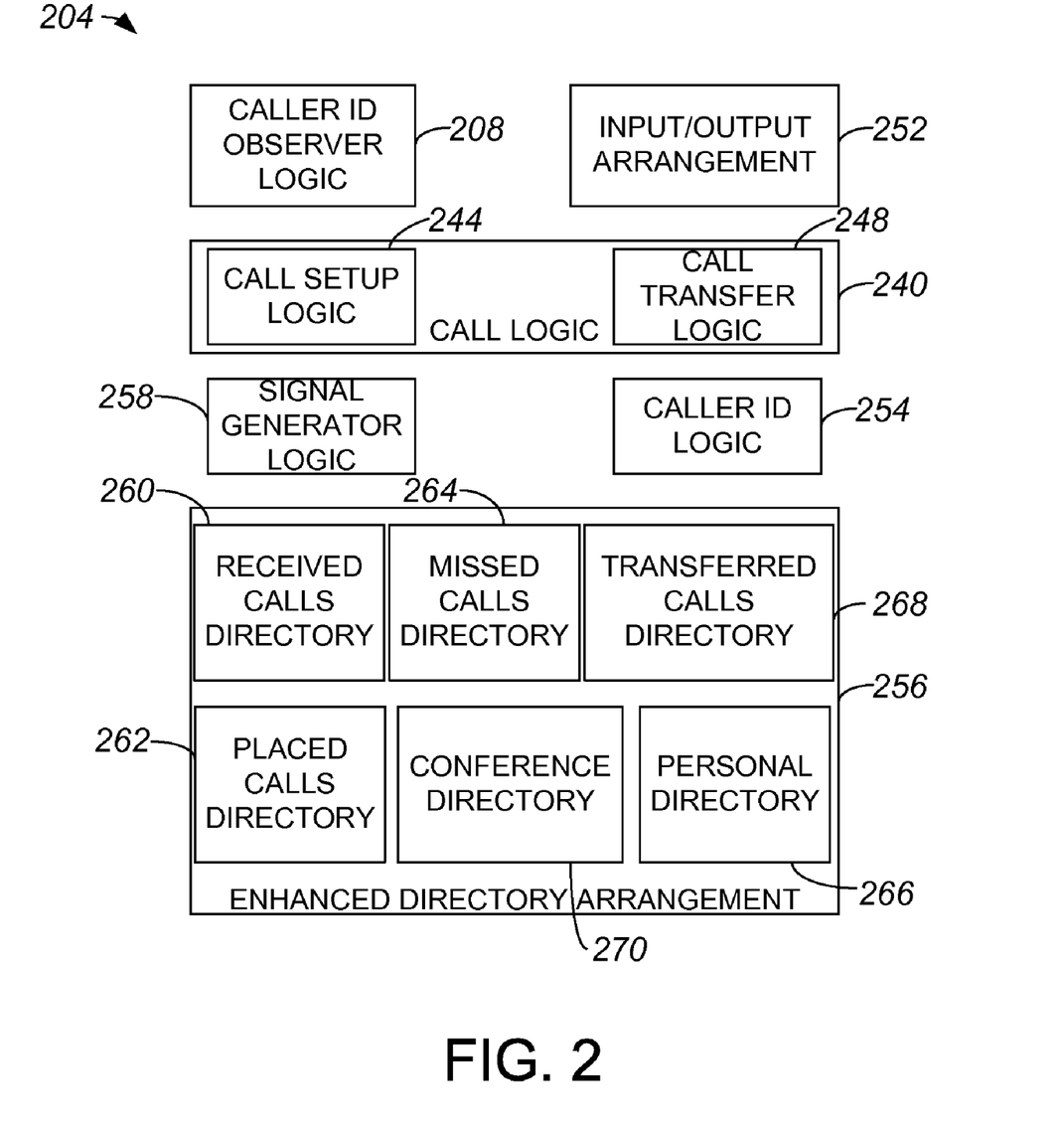
FIG. 2 is a block diagram representation of a communications device which includes a caller identifier (ID) observer and an enhanced directory in accordance with an embodiment of the present invention.

The functionality associated with observers and transferred calls directories is generally implemented as hardware and/or software logic embodied in a tangible medium associated with communications devices, e.g., telephones. FIG. 2 is a block diagram representation of a communications device which includes a caller ID observer and an enhanced directory in accordance with an embodiment of the present invention. A communications device or endpoint 204 includes call logic 240 that generally allows device 204 to initiate a phone call and to receive a phone call. Call logic 240 typically includes call setup logic 244, which allows caller IDs identified by caller ID logic 254 to be stored during the initiation of or the attempted initiation of a phone call. By way of example, a caller ID of a dialed call is stored in a placed calls directory 262 during call initiation, a caller ID of a received call is stored in a received calls directory 260 during call initiation, and a caller ID of a missed call is stored in a missed calls directory 264 during call initiation. In addition to including call setup logic 244, call logic 240 also includes call transfer logic 248 that allows device 204 to transfer a call to a different device (not shown).

Device 204 includes input/output arrangement 252 that allows device 204 to communicate across a network. Input/output arrangement 252 generally includes communications ports that allows communications signals to be sent and received across a network, Signal generator logic 258 is arranged to generate communications signals, e.g., mid-call signals, that may be transmitted using input/output arrangement 252. As will be appreciated by those skilled in the art, communications signals may include packets. Packets may include information elements which specify, but are not limited to specifying, a caller ID of device 204. In one embodiment, an information element may include a policy specification such as a specification that a caller ID is to be masked, e.g., prevented from being sent to another device during a call. A policy specification may be specified by caller ID logic 254 which may also generate a caller ID and, as described above, may identify caller IDs obtained using input/output arrangement 252.

Caller ID observer logic 208 is configured to substantially continuously observe signals or packets obtained using input/output arrangement 252. Signals may be substantially continuously observed or monitored using caller ID observer logic 208 in order to determine when the contents of an information element, which include a caller ID, have changed. By way of example, caller ID observer logic 208 may substantially continuously monitor signals to detect changes in a caller ID. When a change in a caller ID is detected, a transferred call is effectively identified. As such, the new or current caller ID may be registered or otherwise stored by caller ID observer logic 208 in transferred calls directory 268.

Device 204 includes an enhanced directory arrangement 256. Enhanced directory arrangement 256 includes, as previously mentioned, received calls directory 260, missed calls directory 264, and placed calls directory 262. Received calls directory 260 maintains a list of phone numbers, e.g., caller IDs, of devices from which calls have been received Missed calls directory 264 maintains a list of phone numbers from which calls have been missed. Placed calls directory 262 maintains a list of phone numbers to which device 204 has initiated.

Enhanced directory arrangement 256 also includes a personal directory 266 which maintains a list of phone numbers that a user or owner 204 of device 204 has stored. Transferred calls directory 268 maintains a list of phone numbers for devices to which device 204 has effectively been transferred to. That is, transferred calls directory 268 may store caller IDs which identify devices with which device 204 has communicated with as a part of a transferred call, or a call that has not been initiated by device 204 or directly placed to device 204. In one embodiment, transferred calls directory 268 may also store information relating to call transfers effectuated by device 204. In another embodiment, if device 204 places or otherwise participates in a conference call, caller IDs of substantially all conference participants may be stored in a conference directory 270 of enhanced directory arrangement 256.

Figure 3:
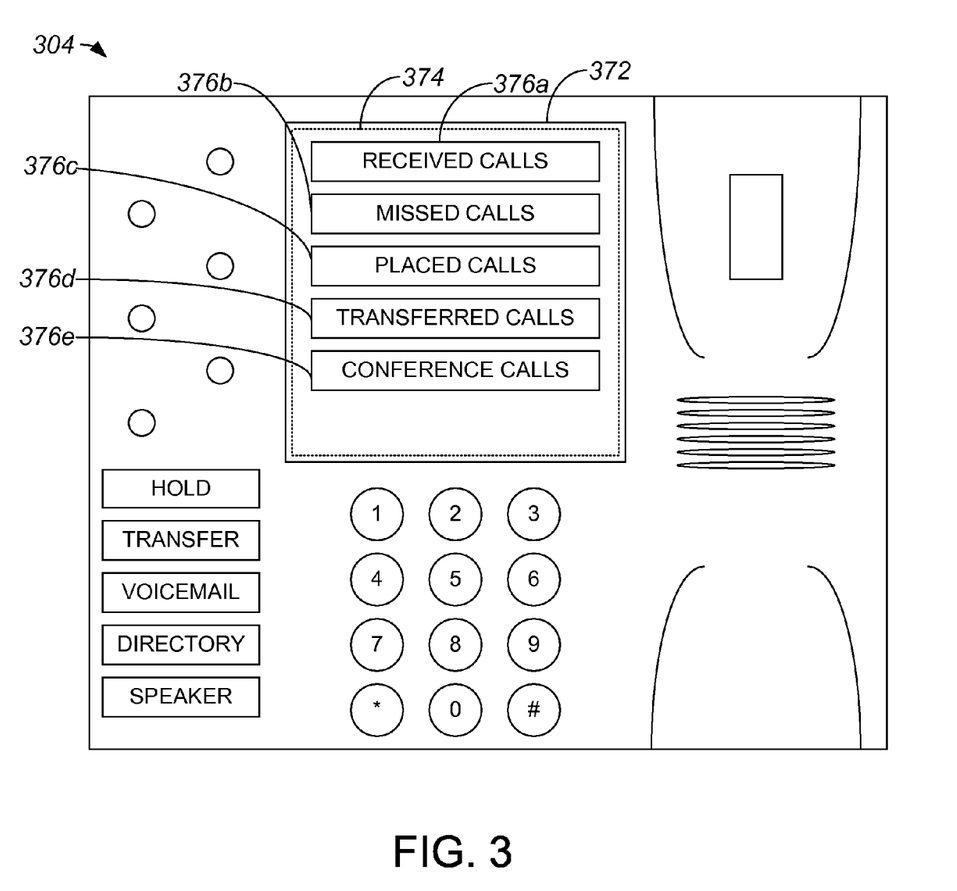
FIG. 3 is a diagrammatic representation of a communications device which includes a display that displays a directory menu in accordance with an embodiment of the present invention.

A communications device or endpoint may include a display screen which displays a directory menu associated with an enhanced directory arrangement such as enhanced directory arrangement 256 of FIG. 2. FIG. 3 is a diagrammatic representation of a communications device which includes a display that displays a directory menu in accordance with an embodiment of the present invention. A communications device 304, which may be a phone, includes a display 372 on which menus and/or call information, e.g., the caller ID of an endpoint at the other end of a call in which device 304 is participating, may be displayed. As shown, a directory menu 374 includes a list of directories 376*a*-376*d* from which selections may be made. By selecting a received calls directory 376*a*, a list of phone numbers or caller IDs associated with received calls may be displayed. Similarly, by selecting a missed calls directory 376b, a list of phone numbers or caller IDs associated with missed calls may be displayed, and by selecting a placed calls directory 376c, a list of phone numbers or caller IDs associated with placed calls may be displayed.

When a transferred calls directory 376d is selected from directory menu 374, a list phone numbers or caller IDs associated with transferred calls may be displayed. Such a list may include, but is not limited to including, phone numbers associated with transferred calls received by device 304, phone numbers associated with transfer targets that are part of a call chain initiated by device 304, and/or phone numbers for with call chain originators and transfer targets associated with transfers effectuated using device 304.

In one embodiment, directory menu 374 identifies a conference calls directory 376e. When conference calls directory 376e is selected from directory menu 374, a list of phone numbers or caller IDS associated with conference calls which have been joined by device 304 may be displayed. Such a list may include, but is not limited to including, phone numbers associated with callers into a specific conference, phone numbers of participants called by a conference bridge, or a combination of the above.

Figure 4:
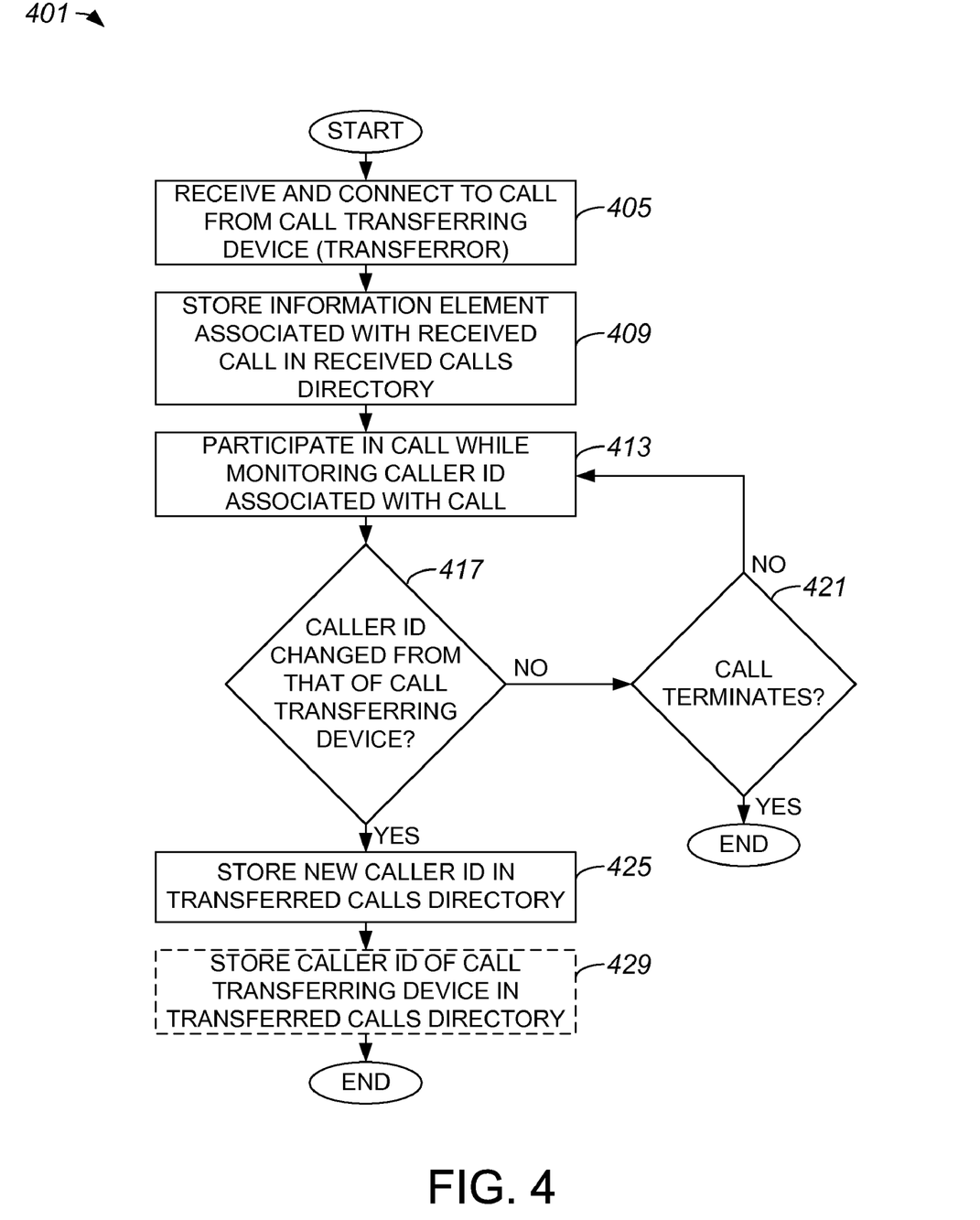
FIG. 4 is a process flow diagram which illustrates a method of processing a call from the point of view of a potential transfer target device in accordance with an embodiment of the present invention.

Referring next to FIG. 4, a method of processing a call from the point of view of a potential transfer target device, or an endpoint that may be on the receiving end of a transferred call, will be described in accordance with an embodiment of the present invention. A method 401 of processing a call begins at step 405 in which a call from a call transferring device, or a transferor, is received by a transfer target device. By way of example, with reference to FIG. 1B, a call 114 may be received by device 104c from device 104b.

As a part of a call set up process, information associated with an information element contained in the received call is stored in a received calls directory of the transfer target device in step 409. The information stored in the received calls directory may be the caller ID of the call transferring device. For ease of discussion, the caller ID of the call transferring device is assumed to not be blocked. After the caller ID of the call transferring device is stored in the received calls directory, the transfer target device participates in the received call in step 413, while substantially continuously monitoring the caller ID associated with the received call. The caller ID is substantially continuously monitored by monitoring information elements associated with the received call.

A determination is made in step 417 as to whether the monitored caller ID has changed. That is, it is determine whether the caller ID is identified as having changed from that of the call transferring device to that of the call chain originating device or transferee. For example, with reference to FIG. 1C, it is determined whether the caller ID observed by device 104c has changed from that of device 104b to that of device 104a. If the determination is that the caller ID is not observed as having changed, it is determined in step 421 if the call is to terminate or otherwise end. If the determination is that the call is to terminate, the method of processing a call is completed. Alternatively, if it is determined in step 421 that the call is not to terminate, then process flow returns to step 413 in which the transfer target device continues to participate in the received call while substantially continuously monitoring the caller ID associated with the received call.

Returning to step 417, if the determination is that the caller ID has changed from that of the call transferring device, the new or current caller ID is stored in a transferred calls directory of the transfer target device in step 425. The new or current caller ID is often the caller ID of the initiator of a call chain. By way of example, with reference to FIG. 1C, the new or current caller ID may be the caller ID of device 104a may be stored by device 104c into a transferred calls directory of device 104c. One example of a transferred calls directory will be discussed below with respect to FIG. 5

In one embodiment, information which identifies the call transferring device may be stored such that the effectuator of the transfer may be readily identified. As such, in an optional step 429, the caller ID of the call transferring device, e.g., device 104b of FIG. 1C, may be stored in the transferred calls directory of the transfer target device, e.g., device 104c of FIG. 1C. The method of processing a call is then completed.

Figure 5:
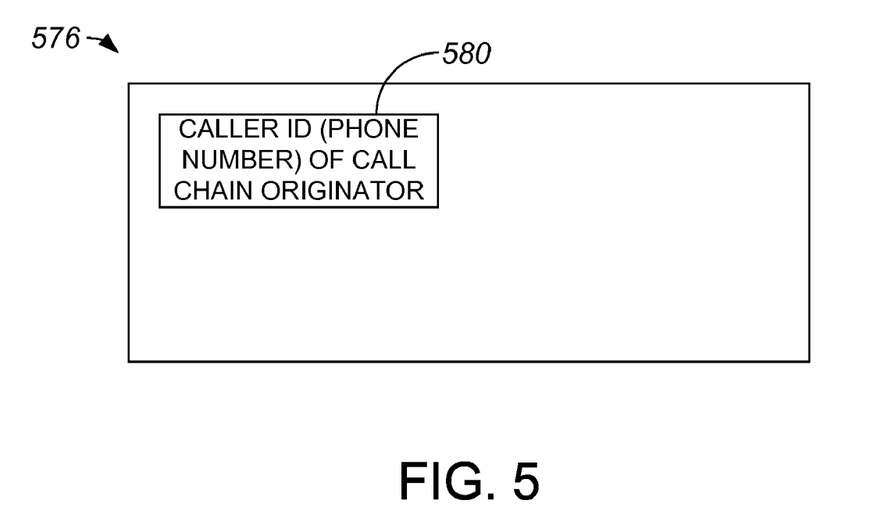
FIG. 5 is a block diagram representation of a transferred calls directory maintained on a transfer target device that identifies a call chain originator in accordance with an embodiment of the present invention.
Figure 6:
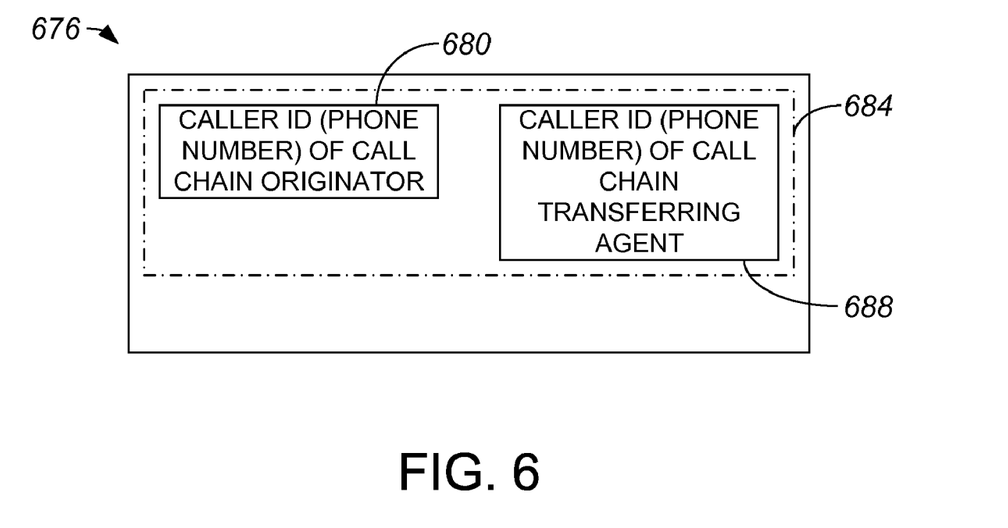
FIG. 6 is a block diagram representation of a transferred calls directory maintained on a transfer target device that identifies a call chain originator and a call chain transferring agent in accordance with an embodiment of the present invention.

With reference to FIG. 5, one example of a transferred calls directory maintained on a transfer target device will be described in accordance with an embodiment of the present invention. A transferred calls directory 576 includes at least one entry 580. Entry 580 includes a representation of a call chain originator, or a transferee, for a transferred call. The representation may be a caller ID or phone number of the call chain originator for the transferred call. As previously mentioned, a transferred calls directory may optionally include information which identifies both a transferee and a transferor, or a device in a call chain which transfers a call. FIG. 6 is a block diagram representation of a transferred calls directory maintained on a transfer target device that identifies a transferee and transferor or a call chain transferring agent in accordance with an embodiment of the present invention. A transferred calls directory 676 includes at least one record or entry 684. Record 684 includes a caller ID 680 or phone number associated with a transferor or a call chain originator. Record 684 also includes a caller ID 688 or phone number of a transferor or a call chain transferring agent. By way of example, with reference to FIG. 1C, if transferred calls directory 676 is associated with device 104c, caller ID 680 may be a caller ID of device 104a, and caller ID 688 may be a caller ID of device 104b.

Figure 7:
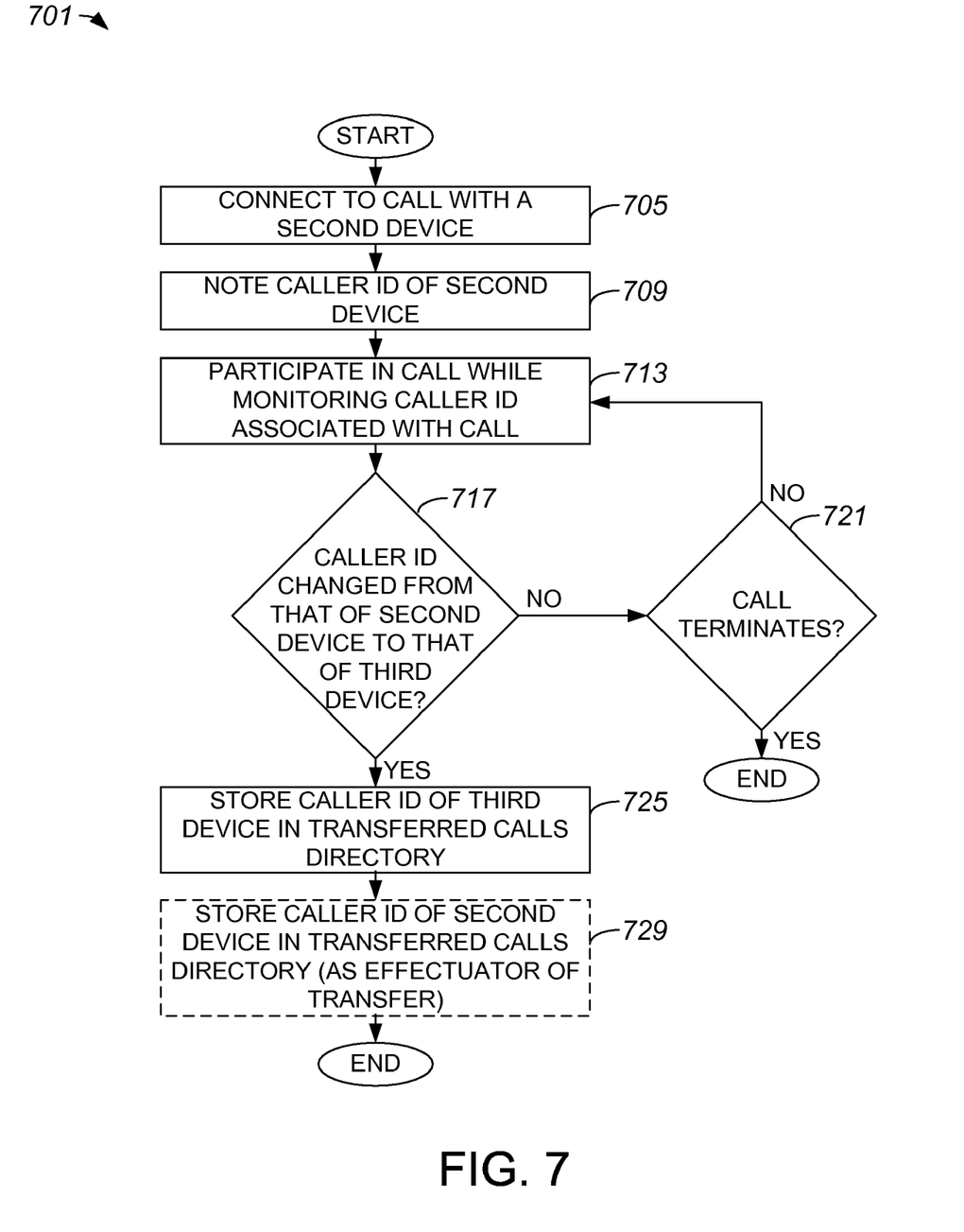
FIG. 7 is a process flow diagram which illustrates a method of processing a call from the point of view of a call originating device in accordance with an embodiment of the present invention.

A transferee, or originator of a call chain, also maintains a transferred calls directory into which caller IDs associated with transferred calls are recorded. FIG. 7 is a process flow diagram which illustrates a method of processing a call from the point of view of a call chain originator or potential transferee in accordance with an embodiment of the present invention. A method 701 of processing a call begins at step 705 in which a call chain originator, i.e., a first device, connects on a call to a second device. Typically, the first device may place a call to the second device. The caller ID of the second device is noted in step 709 for comparison purposes. It should be appreciated that during a call setup process, the caller ID of the second device may be stored into a placed calls directory. As such, noting the caller ID of the second device may include accessing the placed calls directory.

In step 713, the first device participates in the call while monitoring the caller ID associated with the call. Then, in step 717, it is determined whether the caller ID has changed from that of the second device to that of a third, or different, device. That is, it is determined if a transfer of the call has been detected. Such a determination may be made by determining if the caller ID in information elements associated with the call has changed from the caller ID noted in step 709. In one embodiment, the third device may be a transfer target device.

If the determination in step 717 is that the caller ID has not changed from that of the second device to that of a third device, it is then determined in step 721 whether the call is to terminate. If it is determined that the call is not to terminate, process flow returns to step 713 in which the first device continues to participate in the call while monitoring the caller ID associated with the call. On the other hand, if the determination in step 721 is that the call is to terminate, the method of processing a call is effectively completed.

Returning to step 717, if the determination is that the caller ID has changed from that of the second device to that of a third device, the implication is that a call transfer has been detected. As such, process flow moves to step 725 in which the caller ID of the third device is stored in a transferred calls director of the first device. Then, in step 729, the caller ID of the second device, which is the effectuator of the call transfer, may optionally be stored in the transferred calls directory of the first device. Upon storing the caller ID of the third device and, optionally, the caller ID of the second device, in the transferred calls directory of the first device, the method of processing a call is effectively completed. It should be appreciated that although the first call has been described as being initiated by a first call participant and directed to a second call participant, the first call may instead be initiated by the second call participant to the first call participant.

Figure 8:
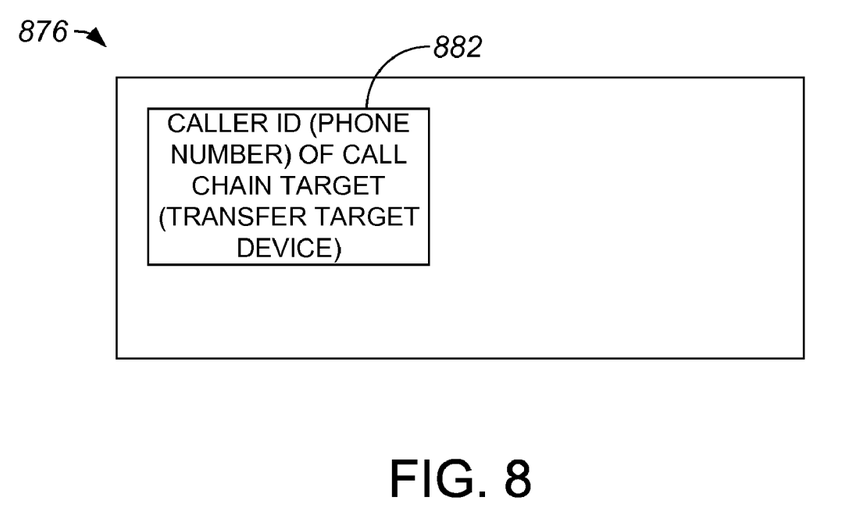
FIG. 8 is a block diagram representation of a transferred calls directory maintained on a call chain originator device that identifies a call chain target device in accordance with an embodiment of the present invention.

With reference to FIG. 8, one example of a transferred calls directory maintained on a call chain originator device or on a transferred party will be described in accordance with an embodiment of the present invention. A transferred calls directory 876 stored on a call chain originator device or on a transferred party, e.g., device 104a of FIG. 1C, may include an entry 882 which effectively identifies a device to which a call placed by the call chain originator device or transferred party has been transferred. Entry 882 may include a caller ID, or phone number, of a transfer target device.

Figure 9:
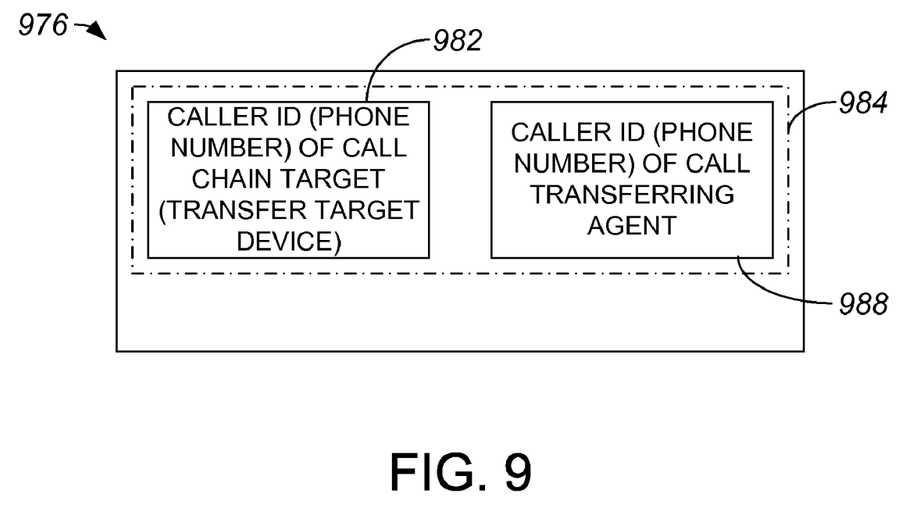
FIG. 9 is a block diagram representation of a transferred calls directory maintained on a call chain originator device that identifies a call chain target device and a call transferring agent in accordance with an embodiment of the present invention.

As mentioned above, a transferred calls directory maintained on a call chain originator device or on a transferred party may be arranged to record information which identifies the device which effectively caused the transfer, e.g., a call chain transferring agent. FIG. 9 is a block diagram representation of a transferred calls directory maintained on a call chain originator device that identifies a transfer target device and a call transferring agent in accordance with an embodiment of the present invention. A transferred calls directory 976 includes at least one record or entry 984. Record 984 includes a caller ID 982 or phone number associated with a transfer target device, or the device to which a call placed by a call chain originator or transferred party device has been transferred. Record 984 also includes a caller ID 988 or phone number of a transferor or a call transferring agent. For instance, with reference to FIG. 1C, if transferred calls directory 676 is associated with device 104a, caller ID 982 may be a caller ID of device 104c, and caller ID 988 may be a caller ID of device 104b. It should be appreciated that if a call placed by the call chain originator is transferred multiple times, the caller ID for each device that transfers the call may be stored in record 984.

Figure 10:
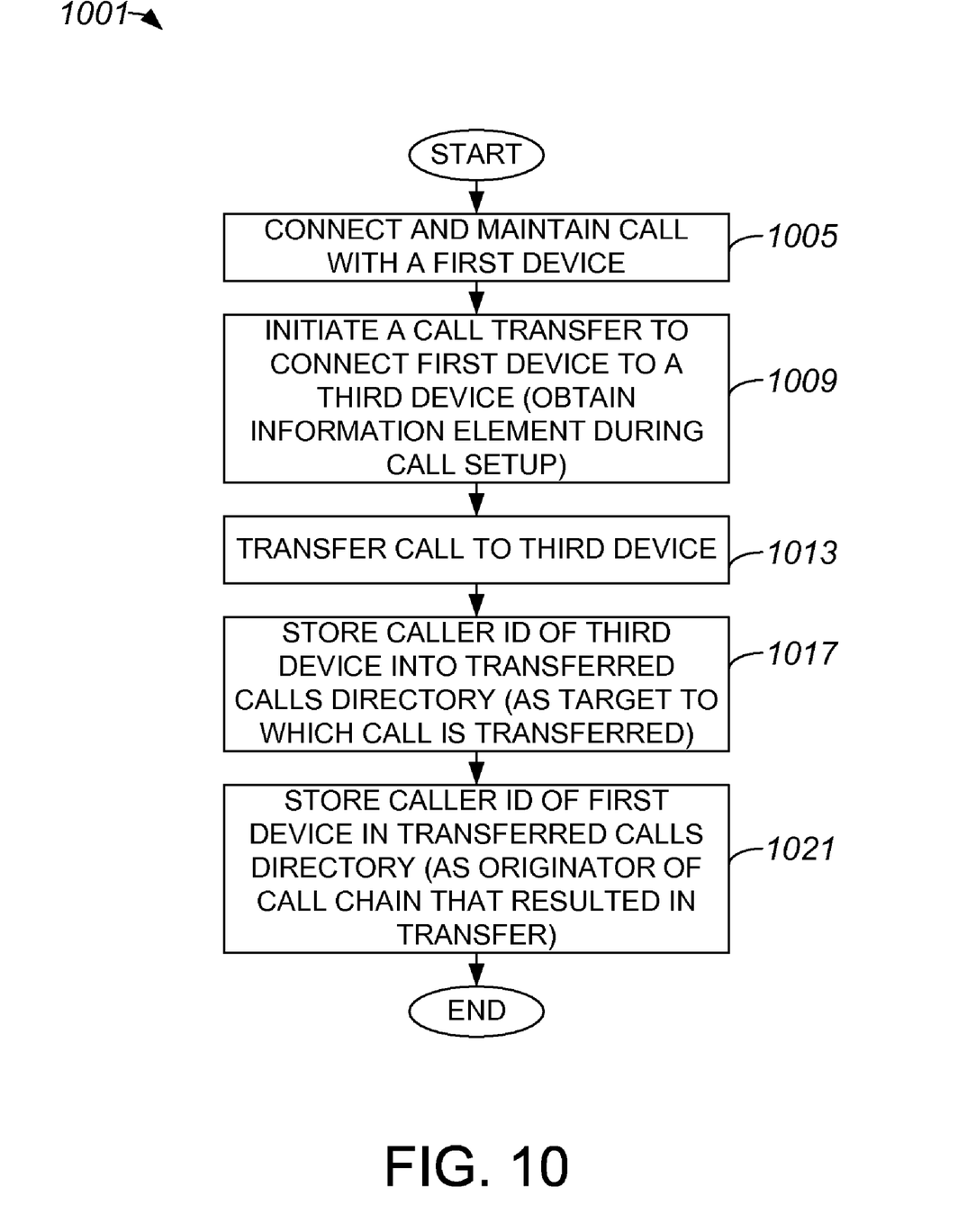
FIG. 10 is a process flow diagram which illustrates a method of maintaining a transferred calls directory on a call transferring agent in accordance with an embodiment of the present invention.

Generally, a transferor of a call, or a call transferring agent, may substantially automatically store a caller ID associated with a call placed during a call transfer process in a placed calls directory. In one embodiment, a call transferring agent may additionally, or alternatively, store the caller ID of a transfer target device and the caller ID of a corresponding call chain initiator or the ID of a transferred party in a transferred calls directory when processing a call transfer. FIG. 10 is a process flow diagram which illustrates a method of facilitating a call transfer from the point of view of a call transferring agent in accordance with an embodiment of the present invention. A method 1001 of facilitating a call transfer begins at step 1005 in which the call transferring agent connects to and maintains a call with a first device. The call may be placed by the first device, which is a call chain originating device. As will be understood by those skilled in the art, during a call setup to establish the call, the call transferring agent may store a caller ID for the first device in a received calls directory. The caller ID for the first device is generally obtain during the call setup from an information element associated with the call Once the call is connected and maintained, the call transferring agent initiates a call transfer in step 1009. The call transfer is initiated to enable the call that is initially between the first device and the call transferring agent to be transferred such that the call is then between the first device and a third device. When a call transfer is initiated, the call transferring agent may place the call on hold while establishing a connection to the third device, e.g., dialing the third device. For purposes of discussion, the connection between the call transferring agent and the third device is assumed to be successful, i.e., a new call between the call transferring agent and the third device is assumed to be successfully established.

After the call transferring agent initiates the call transfer, the call placed by the first device is transferred by the call transferring agent to the third device in step 1013. In transferring the call, the call transferring agent typically becomes idle or otherwise disconnects itself from the call.

The call transferring agent stores the caller ID of the third device into a transferred calls directory in step 1017. The caller ID of the third device may be obtained from an appropriate information element during the call setup process performed when the call transfer was initiated in step 1009. The caller ID of the third device may be identified in the transferred calls directory as a transfer target.

Upon storing the caller ID of the third device into the transferred calls directory, the call transferring agent stores the caller ID of the first device in the transferred calls directory in step 1021. The caller ID of the first device, which was identified during the call setup which occurred when the call was initially connected in step 1005, may be identified in the transferred calls directory as the originator of a call chain that resulted in the call being transferred to the third device. Once the caller IDs of the first and third devices are stored, the method of facilitating a call transfer is completed.

Figure 11:
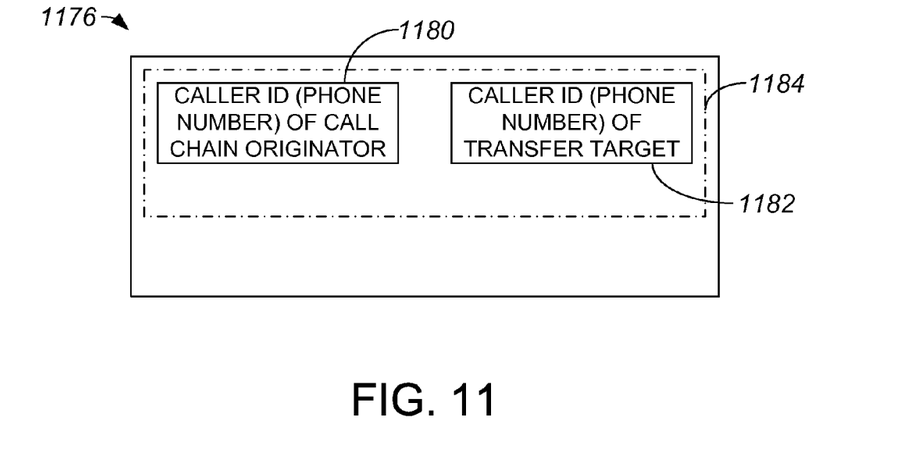
FIG. 11 is a block diagram representation of a transferred calls directory maintained on a call transferring agent in accordance with an embodiment of the present invention.

FIG. 11 is a block diagram representation of a transferred calls directory maintained on a call transferring agent in accordance with an embodiment of the present invention. A transferred calls directory 1176 maintained on a call transferring agent includes at least one record or entry 1184. Record 1184 identifies information relating to a call transfer performed by the call transferring agent. Record 1184 includes a caller ID 1180 or phone number associated with a call chain originator or a transferred party, and a caller ID 1182 or phone number of a transfer target, or the device to which a call placed by a call chain originator device has been transferred.

Figure 12:
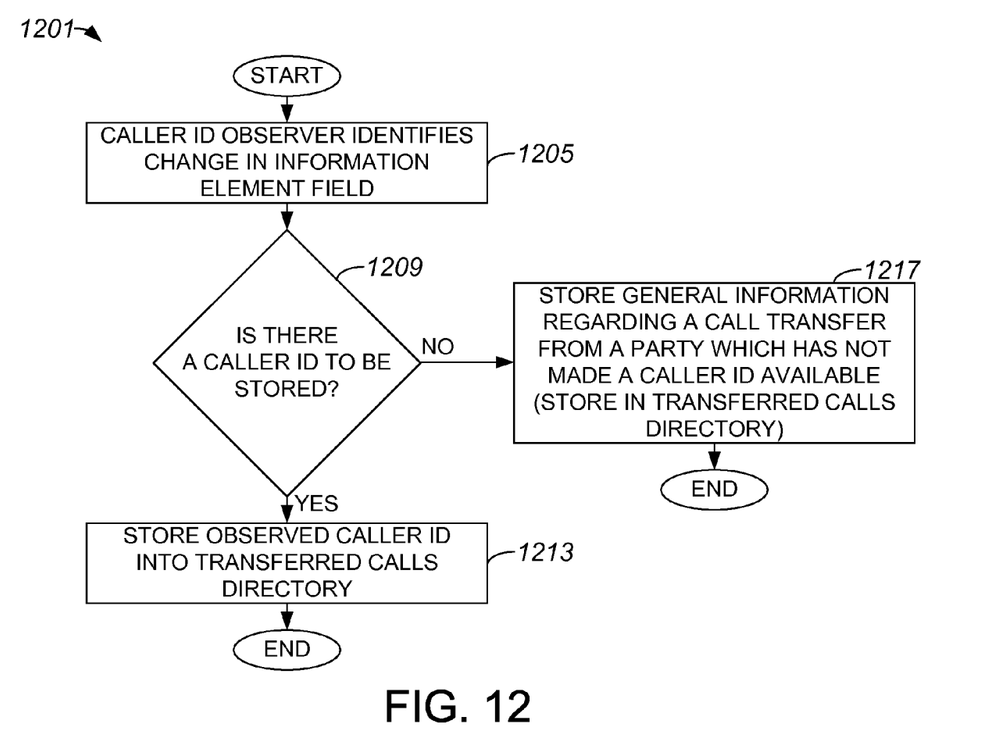
FIG. 12 is a process flow diagram which illustrates one method of processing a change in an information element field as observed by a caller ID observer in accordance with an embodiment of the present invention.

For security reasons, an owner of a communications device may effectively block the caller ID associated with the communications device. When a caller ID of a communications device is blocked, the caller ID is generally not displayed on any other device which is connected with that communications device during a call. A blocked caller ID may be prevented from being stored in a transferred calls directory. Hence, in one embodiment, before a caller ID is stored in a transferred calls directory, a determination may be made as to whether it may be feasible to actually store the caller ID. Typically, when a caller ID for a first party is blocked, that caller ID is not transmitted to other parties. FIG. 12 is a process flow diagram which illustrates one method of processing a change in an information element as observed by a caller ID observer to determine if information stored in the information element field indicates that a caller ID may be stored in accordance with an embodiment of the present invention. A method 1201 of processing a change in an information element as observed by a caller ID observer begins at step 1205 in which the caller ID observer identifies a change in an information element field. The caller ID observer may either be a part of a call chain originator or a transfer target device. Typically, the change in an information element associated with a call may be a change in a caller ID.

A policy, e.g., a security policy, associated with a particular device may be indicated in an information element that originates from the particular device. By way of example, when a caller ID is blocked, the information element may include a string such as a text string which indicates that the caller ID is private or otherwise unavailable. Alternatively, an information element may be sent substantially without any information. A determination is made in step 1209 as to whether there is a caller ID to be stored. That is, it is determined if the change in the information field indicates that a caller ID is effectively blocked.

If the determination in step 1209 is that there is a caller ID to be stored, then the indication is that the change in the information field that was observed in step 1205 is a change in a caller ID that is indicative of a transferred call from a party which has elected not to block an associated caller ID. As such, the observed caller ID is stored into a transferred calls directory in step 1213, and the method of processing a change in an information element as observed by a caller ID observer is completed.

Alternatively, if it is determined in step 1209 that there is no caller ID to be stored, the implication is that although a call transfer has been detected, information relating to the party from which the call is transferred is not available to be stored in a transferred calls directory because the caller ID is effectively blocked. Accordingly, no caller ID is stored into the transferred calls directory. In one embodiment, general information which indicates that a call has been transferred from a party which has not made a caller ID available is stored in step 1217. Such information may be stored in a transferred calls director. Once general information is stored, the method of processing a change in an information element as observed by a caller ID observer is completed.

Although only a few embodiments of the present invention have been described, it should be understood that the present invention may be embodied in many other specific forms without departing from the spirit or the scope of the present invention. By way of example, a caller ID observer has been described as substantially continuously monitoring the caller ID associated with a call to detect changes in the caller ID. In general, substantially continuously monitoring the caller ID includes periodically monitoring the caller ID. The caller ID may be periodically monitored at predetermined time intervals.

Session initiation protocol (SIP) is a communications protocol which provides mid-call signaling information that may be used in conjunction with, or in lieu of, a caller ID observer to effectively monitor mid-call signaling, or signals sent during a call. In one embodiment, a SIP mid-call update may be used to capture information associated with a new endpoint, e.g., an endpoint to which a call has been transferred, that may be stored into a transferred calls directory or, more generally, an enhanced directory arrangement. It should be understood that although SIP is discussed, SIP is just one example of a communications protocol with respect to which the present invention may be implemented. In general, the present invention may be applicable to a variety of different protocols including, but no limited to including, proprietary and standard cellular call protocols, wired protocols, wireless protocols, and integrated service digital network (ISDN) protocols.

While the transfer of a call by an initial call recipient has generally been described, it should be appreciated that a call may instead be transferred by a call initiator. For instance, if device A establishes a call with device B, device A may subsequently transfer that call from itself to device C such that device B and device C are on the call. In such a situation, information may be stored into the transferred calls directories of device B and device C to indicate that device A effectively transferred a call from itself to device C such that device B and device C are on the call.

In one embodiment, a call may be transferred by multiple call chain transferring agents. By way of example, device A may be transferred to device C by device B, and device C may transfer device A to device D. Each call transferring agent may be substantially identified in a transferred calls directory of a final target device, e.g., device D, such that a user of device D may trace an entire call chain back to the call chain originator, e.g., device A.

The steps associated with the methods of the present invention may vary widely. Steps may be added, removed, altered, combined, and reordered without departing from the spirit of the scope of the present invention. For example, before storing a caller ID in any directory, a determination may be made as to whether it is feasible to store the caller ID. That is, it may be determined whether the caller ID is blocked. In one embodiment, the processes of FIG. 4 and FIG. 7 may be such that a first call is initiated by a second call participant rather than a first call participant. Therefore, the present examples are to be considered as illustrative and not restrictive, and the invention is not to be limited to the details given herein, but may be modified within the scope of the appended claims.

What is claimed is:

1. A method comprising:
   establishing a call;
   continuously monitoring the call from a first endpoint associated with the call, wherein monitoring the call includes identifying when an information element associated with the call has changed;
   determining when the information associated with the call has changed; and
   storing a representation of the information element in an enhanced directory arrangement associated with the first endpoint when it is determined that the information associated with the call has changed.

2. The method of claim 1 wherein identifying when an information element associated with the call has changed includes identifying when a caller identifier (ID) associated with the call has changed.

3. The method of claim 2 wherein determining when the information associated with the call has changed includes identifying when the caller ID associated with the call has changed, and wherein storing the representation of the information in an enhanced directory arrangement includes recording the changed caller ID associated with the call in the enhanced directory arrangement.

4. The method of claim 3 wherein the first endpoint is an originator of the call, and establishing the call includes establishing the call between the first endpoint and a second endpoint.

5. The method of claim 4 wherein the changed caller ID associated with the call identifies a third endpoint to which the call has been transferred by the second endpoint.

6. The method of claim 4 further including:
   storing a caller ID which identifies the second endpoint in the enhanced directory arrangement, wherein storing the caller ID which identifies the second endpoint causes the second endpoint to be identified as effectuating a transfer of the call.

7. The method of claim 3 wherein establishing the call includes establishing the call between a second endpoint and a third endpoint, and wherein first endpoint is a transfer target to which the call has been transferred by the second endpoint.

8. The method of claim 7 wherein the changed caller ID identifies the third endpoint as an originator of the call.

9. The method of claim 8 further including:
storing a caller ID which identifies the second endpoint in the enhanced directory arrangement, wherein storing the caller ID which identifies the second endpoint causes the second endpoint to be identified as effectuating a transfer of the call by the second endpoint to the first endpoint.

10. The method of claim 3 wherein the changed caller ID associated with the call identifies a third endpoint to which the call has been transferred by the first endpoint.

11. Logic encoded in one or more tangible media for execution and when executed operable to:
establish a call;
continuously monitor the call from a first endpoint associated with the call, wherein the logic operable to monitor the call is further operable to identify when an information element associated with the call has changed;
determine when the information associated with the call has changed; and
store a representation of the information element in an enhanced directory arrangement associated with the first endpoint when it is determined that the information associated with the call has changed.

12. The logic of claim 11 wherein the logic operable to identify when an information element associated with the call has changed is further operable to identify when a caller identifier (ID) associated with the call has changed.

13. The logic of claim 12 wherein the logic operable to determine when the information associated with the call has changed includes logic operable to identify when the caller ID associated with the call has changed, and wherein the logic operable to store the representation of the information in an enhanced directory arrangement is further operable to record the changed caller ID associated with the call in the enhanced directory arrangement.

14. The logic of claim 13 wherein the first endpoint is an originator of the call, and the logic operable to establish the call is further operable to establish the call between the first endpoint and a second endpoint.

15. The logic of claim 14 wherein the changed caller ID associated with the call identifies a third endpoint to which the call has been transferred by the second endpoint.

16. The logic of claim 14 further operable to:
store a caller ID which identifies the second endpoint in the enhanced directory arrangement, wherein the logic operable to store the caller ID which identifies the second endpoint causes the second endpoint to be identified as effectuating a transfer of the call.

17. The logic of claim 13 wherein the logic operable to establish the call is further operable to establish the call between a second endpoint and a third endpoint, and wherein first endpoint is a transfer target to which the call has been transferred by the second endpoint.

18. The logic of claim 17 wherein the changed caller ID identifies the third endpoint as an originator of the call.

19. The logic of claim 12 further operable to:
store a caller ID which identifies the second endpoint in the enhanced directory arrangement, wherein the logic operable to store the caller ID which identifies the second endpoint causes the second endpoint to be identified as effectuating a transfer of the call by the second endpoint to the first endpoint.

20. An apparatus comprising:
means for establishing a call;
means for continuously monitoring the call from a first endpoint associated with the call, wherein the means for monitoring the call include means for identifying when an information element associated with the call has changed;
means for determining when the information associated with the call has changed; and
means for storing a representation of the information element in an enhanced directory arrangement associated with the first endpoint when it is determined that the information associated with the call has changed.

21. An apparatus comprising:
call logic, the call logic being arranged to enable participation in a call;
an enhanced directory arrangement; and
observer logic, the observer logic being arranged to continuously monitor signals associated with the call, the observer logic is further being arranged to determine when an information element associated with the call has changed, wherein the observer logic is still further arranged to record an indication of the information element in the enhanced directory arrangement when it is determine that the information element associated with the call has changed.

22. The apparatus of claim 21 wherein the observer logic is arranged to determine when an information element associated with the call has changed by determining when the information element has changed from identifying a first caller identifier (ID) to a second caller ID, the first caller ID being associated with a first endpoint associated with the call, the second caller ID being associated with a second endpoint.

23. The apparatus of claim 22 wherein the observer logic is arranged to record the indication of the information element in the enhanced directory arrangement by recording the second caller ID in the enhanced directory arrangement.

24. The apparatus of claim 23 wherein recording the second caller ID in the enhanced directory arrangement identifies the second endpoint as being a transfer target of the call.

25. The apparatus of claim 23 wherein the observer logic is further arranged to cause the first caller ID to be recorded in the enhanced directory arrangement to identify the first endpoint as being responsible for transferring the call to the second endpoint.

26. The apparatus of claim 23 wherein recording the second caller ID in the enhanced directory arrangement identifies the second endpoint as being an originator of the call, and wherein the observer logic is further arranged to cause the first caller ID to be recorded in the enhanced directory arrangement to identify the first endpoint as being responsible for transferring the call to the apparatus.

* * * * *